United States Patent [19]
Rera

[11] Patent Number: 5,113,798
[45] Date of Patent: May 19, 1992

[54] ANIMAL FEEDING DISH

[76] Inventor: Thomas Rera, P.O. Box 7143, Hollywood, Fla. 33081

[21] Appl. No.: 720,265

[22] Filed: Jun. 24, 1991

[51] Int. Cl.⁵ .......................... A01K 5/01; A01K 7/00
[52] U.S. Cl. ...................................... 119/61; 119/51.5
[58] Field of Search ........................... 119/61, 51.5, 53

[56] References Cited

U.S. PATENT DOCUMENTS

| | | | |
|---|---|---|---|
| 2,584,301 | 2/1952 | Sinclair | 119/61 |
| 3,441,003 | 4/1969 | Du Mond et al. | 119/61 |
| 3,664,304 | 5/1972 | Carter | 119/61 |
| 4,357,905 | 11/1982 | Carpenter | 119/61 |
| 4,716,855 | 1/1988 | Anderson et al. | 119/61 |
| 4,721,063 | 1/1988 | Atchley | 119/61 |
| 4,762,087 | 8/1988 | Henecke | 119/61 |
| 4,784,086 | 11/1988 | Hand et al. | 119/61 |
| 4,905,629 | 3/1990 | Hand et al. | 119/61 |
| 4,981,108 | 1/1991 | Facroe | 119/61 |

Primary Examiner—Paul J. Hirsch
Attorney, Agent, or Firm—Malloy, Downey & Malloy

[57] ABSTRACT

A feeding dish adapted to hold items such as pet food in isolated, protective relation from crawling household pests such as fire ants and roaches. The feeding dish includes a base with an outer surrounding wall structure extending upwardly therefrom and disposed about a periphery thereof in surrounding relation to an inner food receptacle so as to form a channel surrounding the food receptacle. The channel may be filled with liquid, such as water, thereby defining a moat about the food receptacle while also providing a drinking receptacle.

3 Claims, 1 Drawing Sheet

ANIMAL FEEDING DISH

FIELD OF THE INVENTION

This invention relates to an animal feeding dish adapted to hold pet food and the like within an inner receptacle which is surrounded by a fluid-filled channel defining an outer drinking receptacle disposed between the inner receptacle and an outer surrounding side wall structure, thereby forming a moat so as to protect the food from crawling pests, such as fire ants and roaches, while also providing a drinking source for the animal.

DESCRIPTION OF THE PRIOR ART

Food bowls and dishes such as those frequently used in feeding household pets are usually comprised of one primary receptacle capable of holding either food or water only. Unfortunately, since pet food is particularly attractive to household pests such as roaches or fire ants and because pets are often fed outside the home, these openly exposed feeding bowls are highly susceptible to infestation. Such infestation can be dangerous and painful to household pets when, insects such as fire ants, which are found in large groups and give painful and venomous bites, enter the feeding dish and the animal thereafter eats both the food and insects. Obviously, this results in painful bites to the animal's mouth while eating, as well as possible internal discomfort and pain. This problem cannot be solved simply by putting a lid on the container because most seals would not be tight enough to keep out small pests, and animals need their food containers open and available for their access. As a result, there is a need for a feeding dish which will successfully keep out household pests, while still being functional and convenient to use.

Since most household pests tend to stay away from water and generally are unable to cross it. A preferred solution to the above-mentioned problem would be to surround the food dish with water. Accordingly, there is a need in the present art for an animal feeding dish which includes a central food dish which includes a central food dish surrounded by a channel of water so as to effectively prevent pests such as roaches and ants from entering the food dish. Such a feeding dish would fill the need for a container which helps keep a pet's food free from crawling pests, while also conveniently providing a single feeding dish to hold both food and water. Although there are some containers that have two receptacles, one for food and one for water, the two receptacles are generally separately disposed within a larger container and do not serve the dual function of providing one container for both food and water, and protecting the food receptacle from crawling pests.

SUMMARY OF THE INVENTION

The present invention is directed towards an animal feeding dish which provides a convenient means of holding items such as pet foods open and accessible to the pet, and free from crawling pests such as fire ants and roaches. The feeding dish which provides a means of holding food and water within a single container is composed primarily of a base, a surrounding side wall structure, and an inner container placed on a support structure. The support structure is disposed in substantially spaced relation from the outer surrounding side wall structure thereby forming a channel therebetween surrounding the support structure and inner container. This channel is adapted to be filled with fluids such as water so as to provide a convenient drinking receptacle while also defining a moat surrounding the inner container. The moat serves as a means to protect the inner container, containing food from crawling pests, the majority of which tend to stay away from water. The inner food container, which is adapted to contain items such as pet food, is elevated above the base by the support structure, and is positioned so that the inner container's upper rim is above the water level of the surrounding channel as well as the level of the top edge of the outer surrounding wall structure, thereby making it readily accessible for the convenient removal of the food within, and causing any overflow of fluid from the channel or moat to flow outside the feeding dish instead of into the inner container which holds the pet's food.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
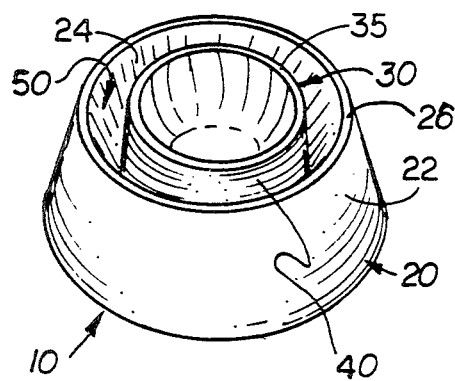
FIG. 1 is a perspective view of the animal feeding dish.
Figure 2:
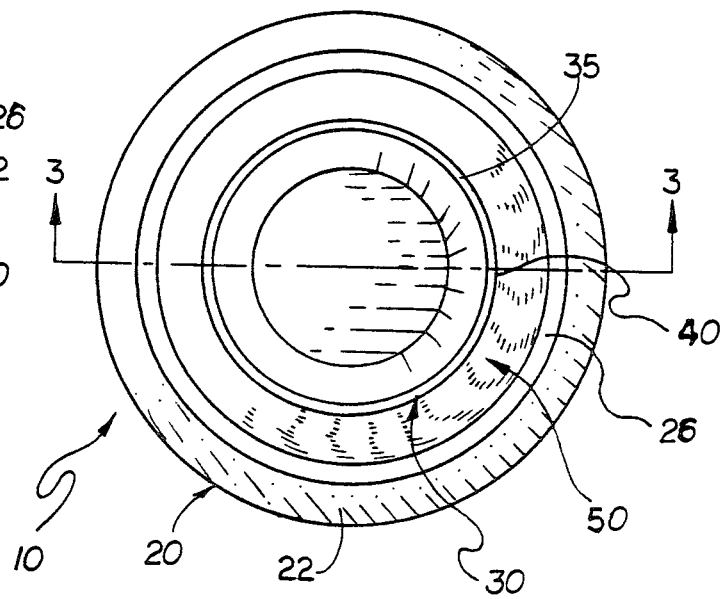
FIG. 2 is an overhead view of the animal feeding dish.
Figure 3:
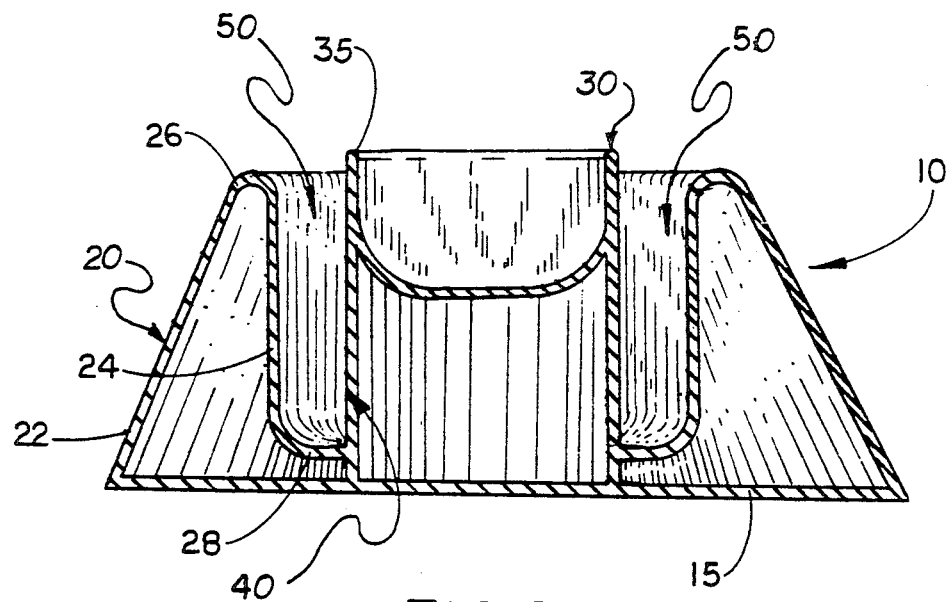
FIG. 3 is a cross-sectional side view of the animal feeding dish along line 3—3 of FIG. 2.

As shown in FIGS. 1-3, the present invention is directed towards an animal feeding dish generally indicated as 10. Referring initially to FIG. 1, the animal feeding dish 10 is comprised primarily of a surrounding side wall structure referred to generally as 20 and an inner container 30 disposed on a support structure 40 which is positioned in substantially spaced relation within the surrounding side wall structure 20. As seen in FIG. 2, the inner container 30 and support structure 40 are concentrically placed substantially within the surrounding side wall structure 20 so as to form a channel or moat 50 which is sufficiently wide to provide easy access, hold a substantial quantity of water, and completely surround the inner container thereby providing adequate protection for the inner container 30 from insects.

As seen in FIG. 3, the animal feeding dish is comprised of a base 15 upon which the rest of the structure will stand. Attached to the base 15 and extending substantially upward is the surrounding side wall structure 20 which is comprised of an outer wall 22 joined at its upper extremity to a substantially vertical inner wall 24 thereby forming an upper ridge 26. The surrounding side wall structure 20 is attached to the outer periphery of the base 15 at the lower extremity of the outer wall 22. Also attached to the base 15 is the support structure 40. The support structure 40 is attached at its lower extremity to the base 15 in a position substantially concentric within the surrounding side wall structure 20, and substantially disposed from the inner wall 24 to define the channel 50 which surrounds the support structure 40. The inner wall 24 of the surrounding side wall structure 20 is attached at its lower extremity to the bottom portion of the support structure to form a substantially horizontal inner base 28 which defines the bottom surface of the channel 50. Disposed on an upper portion of the support structure 40 is an inner container 30. The inner container 30 is attached in elevated relation above the base 15 to the upper portion of the support structure 40 in such a manner that the upper rim 35 formed around the inner container 30 is above the upper ridge 26 of the surrounding side wall structure 20, thereby causing any overflow of fluid within the channel or moat 50 to flow over the upper ridge 26 and out of the animal feeding dish 10 instead over the upper lip 35 and inside the inner container 30.

Now that the invention has been described,

What is claimed is:

1. An animal feeding dish comprising:

a base, a surrounding side wall structure extending substantially vertically upward from said base, said surrounding side wall structure having an inner wall and an outer wall, said inner wall and said outer wall joined at their upper extremity forming an outer ridge, said base connected to said surrounding side wall structure at the lower extremity of said outer wall, a support structure attached to and extending substantially vertically from said base, such that said inner wall surrounds said support structure, said support structure disposed in a substantially spaced, centered relation from said inner wall of said surrounding side wall structure to form a surrounding channel about said support structure, said inner wall of said surrounding side wall structure attached at a lower extremity to a lower portion of the outer surface of said support structure to form a bottom of said channel, said channel being adapted to be filled with fluid, thereby defining a surrounding moat, which is sufficiently wide so as to be accessible by an animal for drinking, and an inner container attached to an upper portion of said support structure so as to be disposed in substantially centered relation within said surrounding moat.

2. An animal feeding dish as in claim 1 wherein said inner container is adapted to contain food.

3. An animal feeding dish as in claim 1 wherein said inner container is substantially elevated by said support structure so as to maintain an upper rim thereof above the fluid level within said channel and said outer ridge.

* * * * *